Patented Sept. 4, 1934

1,972,166

UNITED STATES PATENT OFFICE 1,972,166

MOLDING CELLULOSE DERIVATIVE PLASTICS

George Schneider, Montclair, Arthur E. Petersen, Westfield, and Manuel R. Ximenez, South Plainfield, N. J., assignors to Celanese Corporation of America, a corporation of Delaware No Drawing. Application April 4, 1931, Serial No. 527,856

2 Claims. (Cl. 18—51)

This invention relates to the preparation of articles by the molding of thermoplastic compositions containing organic derivatives of cellulose.

An object of our invention is to mold thermoplastic compositions containing organic derivatives of cellulose which are in such a form that articles may be made therefrom more expeditiously and economically than has been possible heretofore. A further object of our invention is to mold thermoplastic compositions containing organic derivatives of cellulose whilst employing such thermoplastic compositions in the form of chips, flakes or other pieces of substantial size. Other objects of this invention will appear from the following detailed description.

In the ordinary method of making articles from plastic compositions containing derivatives of cellulose, the derivative of cellulose is kneaded at elevated temperatures and for a prolonged period of time with plasticizers and volatile solvents to form a plastic mass, the mass is filtered and then worked between heated malaxating rolls further to convert the same and remove the excess solvents, the slabs so formed are stacked and pressed into a block, sheets are cut from the block and then seasoned for a prolonged period of time, and the sheets then polished by pressing between polishing plates. The sheets so made are then used as blanks from which various articles may be stamped and which are then subjected to various operations such as sawing, routing, drilling, washing, polishing, etc.

This prior and usual method of working up derivative of cellulose plastics involves so many operations that the cost of manufacture is very high. Moreover because of the fact that the residual solvent is held so tenaciously in the sheet material, articles having walls exceeding a certain thickness cannot be made successfully, since the residual solvent remains in the thick walls and after a long period of time tends to volatilize and cause warping.

Another way of working up cellulose derivative plastics is to mold a thermoplastic composition containing the derivative of cellulose and plasticizer in finely disintegrated or powdered form under heat and pressure. While this method produces excellent results, the grinding of the thermoplastic composition into a powder is quite expensive due to the fact that the material tends to soften and become gummy during grinding. Moreover it is not possible to produce commercially suitable articles presenting multicolored or variegated effects by the molding of such powdered thermoplastic compositions.

We have found that articles having superior properties can be made quite economically by molding thermoplastic compositions containing derivatives of cellulose whilst the same are in the form of chips, slabs, flakes or other pieces of substantial size. This method presents many advantages over the ordinary method of working up cellulose derivative plastics, since many of the costly operations are avoided and thick-walled articles which do not tend to warp can be made. This method of molding pieces of substantial size presents advantages over the molding of powder in that the cost of grinding into powder is avoided and mottled or other variegated effects can be produced.

In accordance with our invention, we prepare articles by molding a thermoplastic composition containing an organic derivative of cellulose while in the form of pieces of substantial size.

The thermoplastic composition to be molded contains an organic derivative of cellulose such as organic esters of cellulose and cellulose ethers. Examples of such organic esters of cellulose being cellulose acetate, cellulose formate, cellulose propionate and cellulose butyrate, while examples of cellulose ethers are ethyl cellulose, methyl cellulose and benzyl cellulose. The composition may also contain suitable plasticizers such as dibutyl tartrate, dimethyl phthalate, diethyl phthalate, ortho- and para-ethyl toluene sulfonamid, triphenyl phosphate, triacetin, etc., as is well understood in the art. The amount of plasticizer employed may vary from 25 to 60 or more parts per 100 parts by weight of cellulose derivative.

If colored effects are desired, the thermoplastic composition will contain suitable pigments, lakes and/or dyes. Filling materials such as gypsum, barytes, titanium oxide, etc. may also be added.

It is often advantageous to add resins to the composition, particularly when the molding is done under heat and pressure, to enable the discharge of the molded articles from the mold while they are still warm, thus reducing the time cycle of operation. Examples of such resins are the synthetic resins made by the condensation of benzene-, xylene- or toluene-sulfonamid with formaldehyde, pheno-formaldehyde resins, diphenylol-propane-formaldehyde resins, phthalic-anhydride gycerol resins, etc. These synthetic resins are preferably of the fusible and soluble type of medium hardness, and may be employed in amounts varying from 2 to 10% of the weight of the organic derivative of cellulose present in the plastic composition.

As stated the thermoplastic composition to be molded is in the form of slabs, chips, flakes, etc. The term "pieces of substantial size" employed in the claims is intended to mean pieces that are of larger size than powder and having a size greater than say ⅛ by ⅛".

The slabs, chips, flakes, etc. may be made in any suitable manner. Thus the organic derivative of cellulose and plasticizer may be kneaded at elevated temperatures with a volatile solvent to form a stiff doughy mass, and this mass may then be worked between heated malaxating rolls until conversion is completed and most of the volatile solvent is removed. The sheets or slabs so formed may then be dried or seasoned and these slabs then "chopped" or cut or ground into the chips or flakes. If desired the dried slabs may be cut into blanks of required size and may be molded as such.

The slabs, chips, etc. may be made if desired by mixing the cellulose derivative with a solution of a plasticizer in a liquid which is not a solvent for the organic derivative of cellulose and after intimate admixture volatilizing off such liquid. The resulting intimate mixture of the derivative of cellulose with the plasticizer may then be worked between heated malaxating rolls to form slabs which may be molded, or the slabs may be cut or broken into chips or flakes which may then be molded. If desired rods or tubes of thermoplastic composition containing an organic derivative of cellulose made in the ordinary manner or in any other way may be employed for the molding or chips or flakes may be made from such rods or tubes. Likewise scrap material of the thermoplastic composition may be used in this invention.

We have found that if mottled or multicolored effects having uniformity in designs or distribution of colors are desired, slabs having such mottled effects should preferably be used as starting material. This mottled effect may be produced by working the material between heated malaxating rolls in any of the above described processes whilst working in the colors as is well understood in the art for obtaining mottled effects. The slabs so formed may be molded as such or cut into chips or flakes for molding.

Another method of obtaining more uniformity, is to take two or more slabs of different colors and composite them on the rolls by roll pressure with or without cements. The roll may be either smooth or corrugated. The composited slabs are then broken up into chips or flakes which may then be molded in accordance with this invention.

In one form of our invention the slabs, chips or flakes, may be molded by placing the same into a mold that has been heated say at a temperature of 250 to 350° F. and the members of the mold closed by hydraulic pressure of say 1000 to 2000 lbs. per square inch. The temperatures and pressures employed will vary considerably with the constitution of the thermoplastic composition. If slabs are employed, blanks of the same conforming as closely as possible to the size and shape of the mold will preferably be employed. Beautiful veneered effects may be employed by compositing a sheet of the thermoplastic composition containing the desired effect, say pearl effect, to the slab of the thermoplastic composition during the molding operation. Mosaic and inlaid effects are also easily accomplished. By employing slabs having mottled or other variegated effect produced during the malaxating operation, the molded article will have these effects. Likewise by molding a mixture of chips and flakes having different colors or effects, beautiful multi-colored and variegated effects may be produced.

An important feature of this invention is the making of articles by extrusion molding. In this form of the invention, the chips or flakes of the thermoplastic composition are placed in a pressure cylinder and heated to a suitable temperature, say 250 to 350° F. to at least soften them, and are then forced through a small nozzle into a die or mold of the desired shape. For this operation, apparatus similar in principle to that employed for the die-casting of metals may be used. Preferably the die or mold into which the softened or molten thermoplastic composition is forced is cool or cold, so that the molded articles may be ejected without the necessity of waiting for the mold to cool. The pressure employed for forcing the softened or molten thermoplastic composition into the die or mold may vary from 8000 to 12,000 or more pounds per square inch.

By employing in the extrusion molding a mixture of chips or flakes having different colors or having different effects, multi-colored or variegated effects, such as mottled effects and the like may be formed. If chips broken from multi-colored slabs are used, similar effects may be obtained.

If highly polished molds are employed, the finished article may have a high polish so that no further finishing is required. If desired, the molded articles may be washed and polished.

By this invention articles of any desired form and size may be made, examples of which are pencil and fountain pen caps and barrels, mirror frames, brush holders, puff boxes, trays, shoehorns, picture frames, toilet articles of various kinds, etc.

Unlike articles made by former methods, the articles made by this invention have a more permanent finish. No knife lines reappear upon the application of heat or solvents. The heat and pressure during molding insure a thoroughly homogenized and strengthened product. The products produced by this invention exhibit a greater stability against discoloration effects of heat and sunlight. Articles having mottled or other variegated effects may be produced. Moreover articles of unlimited thickness may be produced and which do not show any tendency to warp.

In order further to illustrate our invention the following specific example is given.

*Example*

The following are examples of the composition of the solid ingredients that may be employed for making a plastic composition of hard, medium and soft consistency.

|  | Hard | Medium | Soft |
|---|---|---|---|
| Cellulose acetate (dry basis). | 100.0 | 100.0 | 100.0 parts by weight. |
| Triphenyl phosphate | 8.1 to 8.7 | 12.2 to 12.8 | 16.4 to 17.0 |
| Paraethyltoluenesulfonamid. | 12.9 to 13.5 | 19.7 to 20.4 | 26.3 to 26.9 |
| Dimethyl phthalate, triacetin or dibutyl tartrate. | 8.1 to 8.7 | 12.2 to 12.8 | 16.4 to 17.0 |

In using pigmented stock there may be added to the above ingredients 25 to 150 parts of pigment.

These ingredients may be worked up into slabs, chips or flakes by any of the methods above described.

It is to be understood that the foregoing detailed description is given merely by way of illustration and that many variations may be made therein without departing from the spirit of our invention.

Having described our invention, what we desire to secure by Letters Patent is:

1. Method of forming articles having multi-colored effects comprising at least softening differently colored separate pieces of substantial size of thermoplastic compositions containing an organic derivative of cellulose and forcing the same under suitable pressure into a die or mold.

2. Method of forming articles having multi-colored effects comprising at least softening differently colored separate pieces of substantial size of thermoplastic compositions containing cellulose acetate and forcing the same under suitable pressure into a die or mold.

GEORGE SCHNEIDER.
ARTHUR E. PETERSEN.
MANUEL R. XIMENEZ.